Patented Mar. 17, 1942

2,276,596

UNITED STATES PATENT OFFICE 2,276,596

POLYMERIZATION OF STYRENE AND ITS HOMOLOGS

Herbert Muggleton Stanley, Tadworth, and Hanns Peter Staudinger, Sutton, England No Drawing. Application March 8, 1938, Serial No. 194,710. In Great Britain March 23, 1937

5 Claims. (Cl. 260—86)

The invention relates to the polymerization of aryl substituted mono-olefines and derivatives thereof and has particular reference to the co-polymerization of styrene and substituted styrenes with esters of unsaturated aliphatic acids.

According to the present invention, one or more aryl substituted mono-olfines are subjected to polymerizing conditions in the presence of one or more esters of crotonic acid.

More particularly styrene and/or methyl styrene is polymerized in the presence of an ester of crotonic acid. Esters of aromatic alcohols with crotonic acid, such as benzyl crotonate, and esters of aliphatic alcohols of relatively high molecular weight with crotonic acid, such as hexyl crotonate and lauryl crotonate, when subjected to polymerizing conditions together with styrene and/or methyl styrene give products suitable as plasticizers for cellulose esters, such as nitrocellulose and cellulose triacetate; and the solid polymers, for example, such as are produced by the co-polymerization of styrene with benzyl crotonate, form valuable resins having the desirable properties of styrene resins.

Polymerization may be effected by any suitable means, such as by a heat treatment with or without the addition of compounds inducing polymerization. We have found that effective polymerization can be carried out by a prolonged heat treatment at a moderate temperature in the presence of a minute quantity of a free unsaturated acid, particularly the acid of the ester undergoing the polymerization. The polymerization may be effected in sealed tubes in the presence of an inert gas chosen to suit the temperature desired. Polymerization may also be effected in the presence of an inert solvent or diluent, for example, by heating under a reflux condenser.

The specified hydrocarbons and esters may be polymerized together in any desired proportions, but we have found it an advantage to use an excess of the hydrocarbon: for example, about two mols. of styrene may be used to one mol. of the ester.

The following are examples:

*Example 1*

2 mols. of monomeric styrene and one mol. of n-hexyl-crotonate were heated together under a reflux condenser for a period of about 90 hours in an inert medium of isopropyl benzene. At the end of the polymerization, the inert medium was distilled off and the residue was purified by treating with petrol ether.

*Example 2*

2 mols. of monomeric styrene and 1 mol. benzyl crotonate containing a trace of free crotonic acid were heated under a reflux condenser in isopropyl benzene acting as diluent. The mixture was kept boiling until a sample, tested with bromine, indicated complete polymerization, the time being about 90 hours. After evaporation of the diluent and purifying the residue with petrol ether, the residue was steam distilled and dried.

What we claim is:

1. The production of a styrene-type polymerization product by subjecting a monomeric hydrocarbon of the group consisting of styrene and methylstyrene to polymerizing conditions together with an ester derived from crotonic acid and a saturated monohydric alcohol having from 6 to 12 carbon atoms in the molecule.

2. The production of a polymerization product according to claim 1, the said hydrocarbon being methylstyrene.

3. The production of a polymerization product according to claim 1, the said hydrocarbon being present in excess.

4. As an article of manufacture, a polymerization product of styrene and an ester derived from crotonic acid and a saturated monohydric alcohol having from 6 to 12 carbon atoms in the molecule.

5. As an article of manufacture, a polymerization product of methylstyrene and an ester derived from crotonic acid and a saturated monohydric alcohol having from 6 to 12 carbon atoms in the molecule.

HERBERT MUGGLETON STANLEY.
HANNS PETER STAUDINGER.